July 2, 1957  J. G. ROE  2,797,489
TAPE MEASURE
Filed July 21, 1953
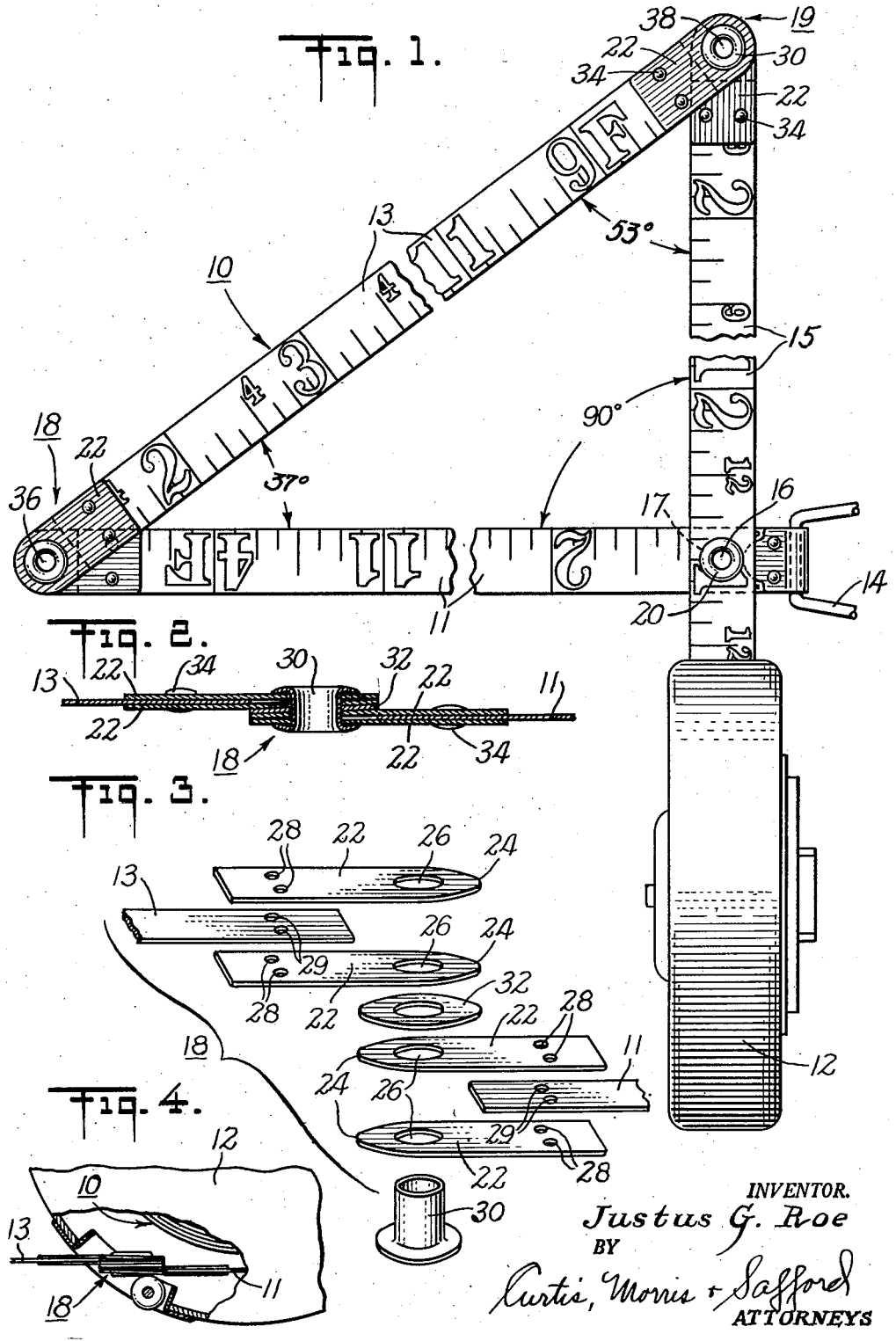
INVENTOR.
Justus G. Roe
BY
Curtis, Morris + Safford
ATTORNEYS

United States Patent Office 2,797,489
Patented July 2, 1957

2,797,489
TAPE MEASURE

Justus G. Roe, Patchogue, N. Y., assignor to Justus Roe & Sons Inc., Patchogue, N. Y.

Application July 21, 1953, Serial No. 369,391

5 Claims. (Cl. 33—137)

This invention relates to tape measures or bands wound within a case, and more particularly to a tape measure that may be used for laying out angles of various sizes quickly and easily.

Under certain conditions in the trades, such as the building industry, it is often desirable to measure in addition to linear distances various angular relationships. Angles may be measured with ordinary tapes, but it requires at least two men to do it accurately. The present invention contemplates a special tape measure or flexible ruler which has novel hinges therein at spaced intervals which interconnect the various segments of the tape. These segments may be pivoted and the hinges simultaneously provide anchor points for the measuring of angles, and the arrangement is such that one individual may quickly and accurately measure angles. It is an object of the present invention to provide a tape measure or ruler with a plurality of segments flexibly connected by hinges which are both non-binding and also permit coiling and uncoiling of the tape within a small case. It is a further object to provide an improved hinge construction of the above character. Other and further objects will be in part apparent and in part pointed out as the specification proceeds.

In the drawings:

Figure 1 is an enlarged top plan view with parts broken away of a tape measure according to the present invention showing it arranged to measure a right angle;

Figure 2 is a further enlarged sectional view of the hinge of the tape of Figure 1 in the longitudinally aligned position;

Figure 3 is an exploded perspective view of the hinge of Figure 2; and,

Figure 4 is a sectional view of a tape measure according to the present invention showing a hinge passing into the case.

Referring now to Figure 1, the flexible tape 10 comprises a thin narrow steel tape or ribbon graduated in inches and segments thereof. Tape 10 has a case 12 into which it may be conveniently reeled and withdrawn, and has a loop type pull handle 14 at its free end.

Tape 10 is divided into three segments or sections, the first section 11 being from the free end or handle 14 to the 4 foot 1 inch mark, the second section 13 being from the 4 foot 1 inch mark to the 9 foot 1 inch mark, and the third section 15 being the remainder of the tape. Tape 10 has at the "1 inch" mark an index or anchor hole 16 which is formed by an eyelet or hollow rivet 17 (indicated by the broken lead line) inserted in a hole in the tape to provide the reinforced hole or opening. Interconnecting the sections 11, 13, and 15 at the 4 foot 1 inch and the 9 foot 1 inch points are two identical hinges 18 and 19 and at the 12 foot 1 inch mark is a second index or anchor hole 16 identical with hole 16 in eyelet 17 and formed by an eyelet or hollow rivet 20.

Referring now to Figures 2 and 3, each of hinges 18 and 19 is formed by two pairs of identical small plates 22 of the same material as the tape itself and rounded at one end 24. Punched in this rounded end is a relatively large hole 26, while two small holes 28 are punched in the other end. A hollow rivet 30 joins the plates together through the larger holes 26. In assembling the hinge, a washer 32 is inserted between the two pairs of hinge plates 22 and the rivet 30 is inserted through the holes 26 and then headed over. Rivet 30 is of the hollow type and is headed over to force the hinge plates 22 into frictional engagement about washer 32 to provide a substantially flat friction hinge.

The hinge assembly 18 is inserted in the tape by cutting a continuous tape at the above indicated marks and removing approximately one-quarter inch of the tape from the juncture of the sections to compensate for the added length of the hinge. Small holes 29 are punched in the adjacent tape ends and each of these ends is then inserted between the corresponding pair of plates 22 of a hinge. Each tape end is then secured to the hinge plates by flush rivets 34 through the holes 28 and 29. With this construction, hinge connections between the tape sections are obtained having ample flexibility, but at the same time substantial rigidity against torsional stresses. Thus the hinges will not tend to bind and prevent proper use of the tape. The hinges provide eyelet openings 36 and 38 which act as index or anchor holes.

For purposes of explaining the use of this tape, assume that a right angle line is to be laid out from the base line of section 11 of the tape in Figure 1. The opening 16 in eyelet 17 is placed at the point on this base line which is to be the corner from which the right angle line is to be extended, and a fixed anchor hook or nail is driven or extended through this opening thus to anchor the end of the tape. The tape is then extended along the base line for 4 feet 1 inch to the hinge 18, at which point a second anchor hook or nail is driven or extended through opening 36 in the hinge to anchor the first section 11 of the tape. The tape section 13 is then extended and turned with respect to section 11 at an angle somewhat as shown, until hinge 19 is reached. Tape section 15 is then turned with respect to section 13 and extended until the index or anchor hole in eyelet 20 is positioned over and slips on the anchor hook nail of the first mentioned anchor hole 16.

With the tape sections in these relative positions and fully extended, section 13 extends at an angle of about 37° from section 11, and section 15 extends at an angle of about 53° from section 13 and at an angle of 90° from section 11. Hence section 15 provides the right angle line from the base line of section 11 and a nail or other anchor member is inserted down through opening 38 in hinge 19 so as to securely anchor all of the sections of the tape. The nails or other anchor means for the holes 36, 16 and 38 may also be used for guide lines or cords, for example, to lay out the foundation for a building.

When the illustrative angles are desired these may be obtained with the tape here shown. Under some circumstances, an additional eyelet such as 20 is provided in the tape at the 13 feet 1 inch mark, and when this is used the triangle has a 77° 20' angle and two 51° 20' angles. Under other circumstances, the section lengths and the positioning of the eyelets may be changed.

The thickness of the sheet metal parts have been somewhat exaggerated in the drawings to bring out the structure so that these dimensions are not to exact scale. Hence the actual hinges are relatively thinner than represented in the drawings and readily wind within the case 12 between the turns of the tape.

As various embodiments may be made of the above invention and as changes might be made in the embodiments above set forth, it is to be understood that all matters hereinbefore set forth or shown in the accom-

I claim:

1. In a tape of the type described, a flexible thin tape having three separate sections or segments, one of said sections being hinged respectively at its ends to the other of said sections, each of said hinges comprising, two pairs of hinge plates respectively positioned with the end of each adjacent tape section between a pair of said plates, said plates having overlapping free ends with a hinge hole therethrough; a washer positioned between the two pairs of hinged plates, and a hollow rivet inserted through said hinge hole and headed over to form a tight friction hinge between said sections.

2. A device as described in claim 1 wherein said other tape sections have adjacent the free ends thereof at least one reinforced index hole.

3. A flexible tape measure of the type adapted to be conveniently reeled and withdrawn from a case which comprises a thin steel tape graduated in inches and segments thereof, at least two hinge assemblies disposed at spaced intervals in said tape, an eyelet positioned in said tape adjacent each end thereof, said hinge assemblies including two pairs of hinge plates each pair comprising a first and second hinge plate secured on opposite sides of the tape ends to be joined, each of said hinge plates having a free end with a pivot hole therein, the hinge plates of one tape end to be joined overlapping the other hinge plates of the other tape end, a washer positioned between adjacent hinge plates of the two pairs, and a hollow rivet inserted through said holes and headed over to clamp said hinge plates and form a friction joint.

4. In a multi-segment flexible tape ruler of the type adapted to be reeled and withdrawn from a case, a hinge assembly for joining said segments which comprises, in combination, two pairs of hinge plates each pair of which comprises first and second hinge plates for one of said segment ends to be joined, each of said plates having a hinge hole in one end thereof and a pair of rivet holes in the other end thereof, said hinge holes being in axial alignment, a hollow rivet hinge pin extending through said hinge holes, and a washer, said hinge plates being assembled on said rivet with said washer between the two pairs of said hinge plates, and said rivet being headed over and forcing said plates and washer into frictional engagement.

5. A device as described in claim 4 wherein said segments are of lengths such that said hinge assemblies are positioned at the four foot one inch and the nine foot one inch positions respectively, and a pair of eyelets in said tape which are positioned at the one inch and the twelve foot one inch positions whereby a triangle may be formed with a 37°-53°-90° angular relationship between the sides.

References Cited in the file of this patent
UNITED STATES PATENTS

| | | |
|---|---|---|
| 759,313 | Roe | May 10, 1904 |
| 884,904 | De Lashmutt | Apr. 14, 1908 |
| 2,005,668 | Volz | June 18, 1935 |